United States Patent [19]

Scholle

[11] 3,940,018

[45] Feb. 24, 1976

[54] COMBINATION LIQUID CONTAINER AND DISPENSER

[75] Inventor: William R. Scholle, Corona del Mar, Calif.

[73] Assignee: Scholle Corporation, Northlake, Ill.

[22] Filed: Apr. 4, 1974

[21] Appl. No.: 457,707

Related U.S. Application Data

[63] Continuation-in-part of Ser. No. 291,952, Sept. 25, 1972, abandoned.

[52] U.S. Cl. ........................ 222/1; 206/506; 220/7; 222/185

[51] Int. Cl.² .......................................... B65D 25/22

[58] Field of Search ........... 221/285, 286; 220/97 E, 220/97 B, 29, 6, 7; 217/15, 47; 222/105, 183, 185, 1; 206/505, 506

[56] References Cited

UNITED STATES PATENTS

| | | | |
|---|---|---|---|
| 2,244,841 | 6/1941 | Johnson | 220/97 E |
| 3,117,695 | 11/1964 | Cox, Jr. | 222/105 |
| 3,212,681 | 10/1965 | Weikert | 222/183 |
| 3,279,641 | 10/1966 | Fredrick | 220/97 E |
| 3,371,824 | 3/1968 | Goss | 222/105 |
| 3,659,743 | 5/1972 | Box | 220/97 E |

FOREIGN PATENTS OR APPLICATIONS

| | | | |
|---|---|---|---|
| 1,450,763 | 7/1966 | France | |
| 1,252,816 | 12/1960 | France | 220/97 E |

*Primary Examiner*—Robert B. Reeves
*Assistant Examiner*—David A. Scherbel
*Attorney, Agent, or Firm*—Gary, Juettner, Pigott & Cullinan

[57] ABSTRACT

A combined container and dispenser for liquids such as milk and the like comprises a reusable, rigid case having an open top, and containing a flexible plastic bag filled with liquid, the bag having a dispensing tube extending therefrom near one end of the case to enable dispensing of the liquid by gravity after the case is disposed on its one end in an appropriate dispenser. The case includes a pair of pivotally mounted brackets adapted to be pivoted or folded over the open top of the case into a closed position to retain the filled bag in the case during dispensing of the liquid. When the brackets are in their closed position, overlying the open top of the case, the dimensions of the case correspond to those of the standard disposable bulk milk box that fits within a standard bulk milk dispensing cabinet. When closed the brackets increase the width dimension of the case.

11 Claims, 4 Drawing Figures

COMBINATION LIQUID CONTAINER AND DISPENSER

CROSS REFERENCE

This application is a continuation-in-part of application Ser. No. 291,952, filed Sept. 25, 1972 now abandoned.

BACKGROUND OF THE INVENTION

The present invention relates to an improved milk container and dispenser of the type wherein the milk is contained in a flexible bag supported within and protected by an outer rigid container.

The prior art contemplates essentially two different modes of transporting and dispensing multiple-gallon quantities of milk. In the conventional handling of bulk quantities of milk, a flexible plastic bag is disposed within a corrugated fiberboard or cardboard container or box and filled with milk. After filling, the flaps of the container are closed and sealed to enable shipping of the carton to its intended destination. The bag normally has a sealed dispensing tube which is drawn out of one end of the box through a suitable opening that is torn or cut in the end of the container.

The cardboard container mentioned above is normally rectangular in shape and has predetermined or standard dimensions which enable the container to fit on its said one end into a conventional refrigerated dispensing cabinet. A typical dispensing cabinet will have internal dimensions to accept one container or a plurality of containers arranged in a side-by-side relationship. To dispense the milk, the container is supported on the end having the drain tube, and the tube is withdrawn from the container and passed through a pinch valve to permit convenient dispensing of the milk. A container of this nature is described in Roak et al. U.S. Pat. No. 3,138,293.

The materials from which the aforesaid containers are constructed are considered to be disposable, and the entire container is discarded when the inner plastic bag has been depleted of milk. The one-time use of each carton obviously presents disposal and waste problems. Furthermore, the cost of the container must be added to the cost of the milk.

When transporting the milk-filled cardboard boxes above described, it has been customary to place one or more of them into a standard dairy case. This is a form of container having widespread use in the dairy industry. Such cases have an open top and are composed of rigid materials such as plastic, wood, wire or the like, so that they are reusable. The cases are generally used to transport a plurality of cartons or bottles of milk and other products from the dairy to the consumer. The cases are ultimately returned to the dairy for reuse, and the dairy has equipment, such as automated floor chain conveyors, to move or convey single or stacked cases from one location to another for cleaning the cases, refilling them with product and conveying the filled cases to a loading dock or truck.

Dairy transport cases have standard dimensions to insure interchangeability and uniform packing systems, and the dairy processing equipment is specifically designed to accommodate a case having a given transverse dimension or width. A case wider than standard would not fit in the processing equipment, and a narrower case would tend to jam the equipment and could not be processed successfully.

From the foregoing, it would be desirable to provide a reusable shipping and dispensing case that could be accommodated in a standard dispensing cabinet, as well as having the capability of being processed through existing dairy equipment. One proposal has been to substitute the standard dairy transport case for the standard cardboard container and thereby eliminate the need for the disposable cardboard case. This proposal, however, suffers the disadvantage that the dairy transport case is too wide for the standard refrigerated dispensing cabinet. The standard cardboard container is approximately 10 to 11 inches wide, whereas the standard dairy case is typically about 14 inches wide.

An alternate proposal, which is the converse of that described immediately above, is to provide a reusable case having a width that could be accommodated in a standard dispensing cabinet, i.e., a rigid reusable box much like the disposable cardboard box. Examples of such containers and related matter are shown in U.S. Pat. Nos. 3,212,681; 3,297,206; 3,343,719; 3,371,824; and 3,435,990. Such proposal, however, suffers the disadvantage that the narrower width case could not be successfully processed through existing dairy conveying and cleaning equipment, and the modification of the equipment to accept both sizes is not practical or feasible.

SUMMARY OF THE INVENTION

The present invention provides a solution to the apparent dilemma described above by providing a reusable shipping and dispensing case which can be accommodated in the standard dispensing cabinet and yet be processed through existing dairy equipment. This result is made possible by providing a reusable case with movable elements which allow conversion of the dimensions of the case from one effective, rigid, unyielding width to another, whereby the case has the dual capacity of being accommodated in both of the aforesaid environments.

More particularly, a rigid open top case made of reusable materials is provided with a pair of movable brackets mounted on opposite sides of the case. When in a closed position, a portion of the brackets overlies the open top of the case and serves to retain a milkfilled bag within the case when the case is stood on its end in a dispensing cabinet. When moved to an open position, the brackets swing out and down and abut against the rigid side walls of the case so that they extend laterally outward from opposite sides of the case in a rigid, unyielding fashion, thereby to augment and increase the solid dimensional width of the case at each side. The combined lateral dimensions of the brackets in their open position correspond to the difference in width between the standard, relatively narrow cardboard bulk milk box and the wider standard dairy transport case.

The prior art discloses various containers having movable or swingable handles, such for example as U.S. Pat. Nos. 3,659,743; 2,244,841; 3,279,641; 2,395,542; 2,550,804; and French Pat. No. 1,252,816. In some of these disclosures, the handles serve in their closed position to retain goods in the containers and/or to facilitate stacking of containers. However, the handles serve no function whatever in their open position. Thus, the contribution of such prior art falls far short of the present invention since they contain no teaching whatever of the essential concept, i.e., a container having convertible rigid width dimensions facilitating adaptation thereof to two seemingly inconsistent environments. The prior art did not recognize the problems presented herein or the solution provided by the present invention.

THE DRAWINGS

DESCRIPTION OF THE PREFERRED EMBODIMENT

Figure 1:
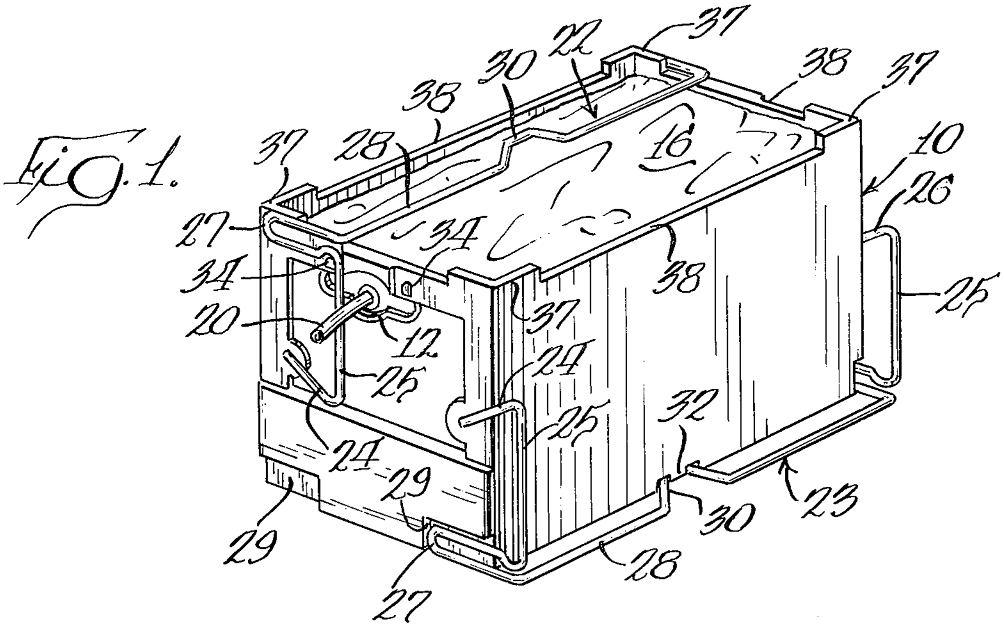
FIG. 1 is a perspective view of the preferred embodiment of the liquid container and dispenser of the present invention, illustrating one bracket in closed position and the other in open position.

As illustrated in the drawings, a major component of the novel milk container and dispenser is a rectangular open top rigid container or case 10, preferably of construction similar to a dairy case composed of smooth or finished material, such as plastic or the like, whereby the case provides a rigid, fully protective container for the flexible bag filled with milk and is reusable. The case 10 preferably has elongated openings 12 in opposite ends thereof near the open top which serve as hand holds. Although a smooth material is preferred, the box may be constructed from any other suitable permanent material, such as wood, metal, wire and the like, and, if necessary, the interior surfaces of the case may be covered with a paper liner before insertion of the plastic bag.

The case itself is of a size corresponding to a standard bulk milk dispensing box, so that it will be accommodated in a standard size milk dispensing cabinet. Thus, the width of the case, measured transversely between the sides thereof, is about 10 to 11 inches, which corresponds to the width of a standard corrugated or cardboard dispensing carton, whereas the corresponding dimension of a standard dairy case is about 13 to 14 inches.

Figure 4:
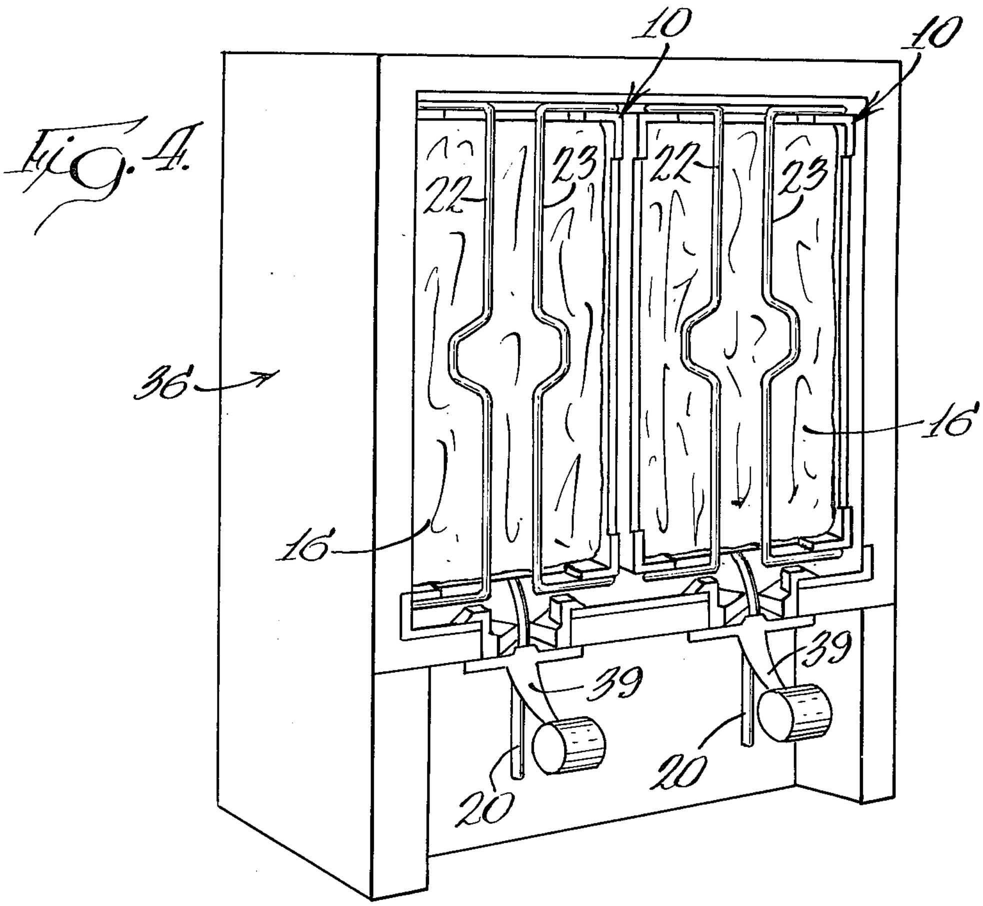
FIG. 4 is a perspective view of a refrigerated bulk milk dispenser with the doors removed and having two of the containers of FIG. 1 inserted therein.

An impervious flexible plastic bag 16 is employed as a container for the liquid, such as milk, to be transported and dispensed. The bag 16 is sized so that when it is filled with liquid it will fit within and substantially fill the case 10, with the top of the filled bag being substantially flush with the hand holds 12. As shown in FIGS. 1 and 4, a single opening is provided in the bag, to which is secured a fitting having a sealed tube 20 extending outwardly therefrom.

When the plastic bag 16 is placed in the case 10, the tube 20 is positioned within the interior of the case closely adjacent one of the hand holds 12, so that the tube 20 may be later conveniently withdrawn through the hand hole 12 and prepared for dispensing.

Figure 3:
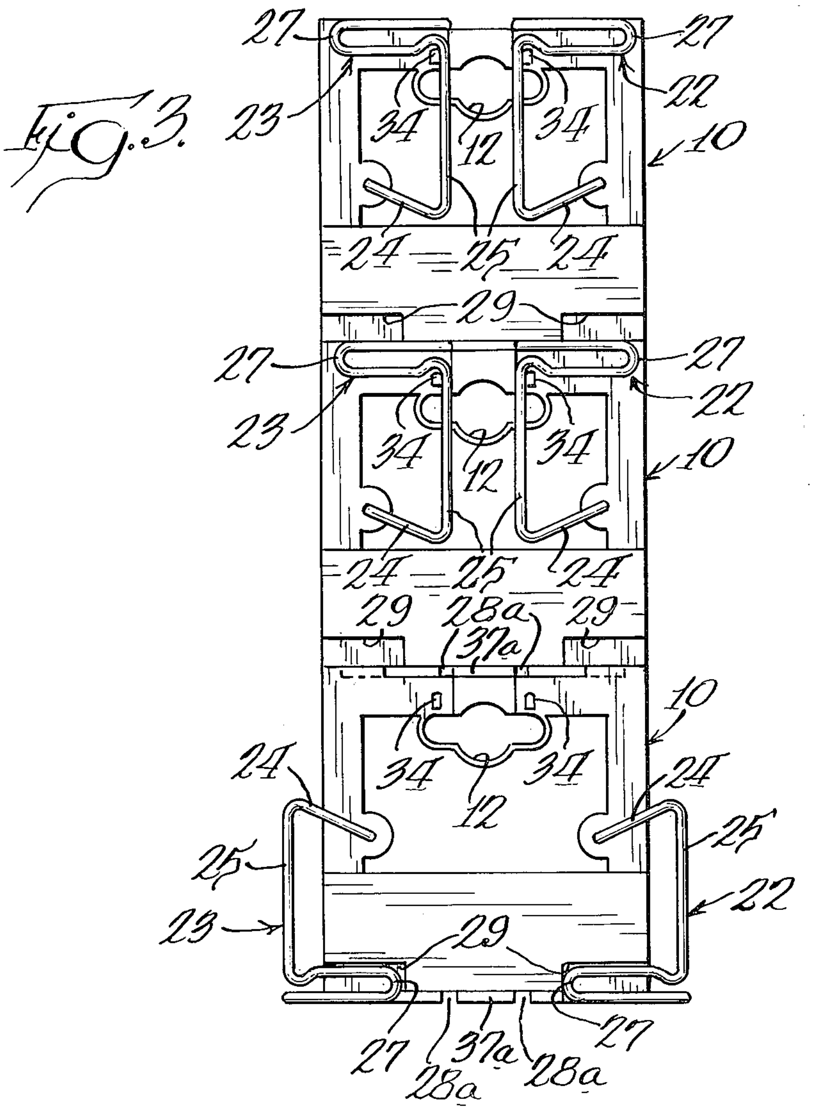
FIG. 3 is an end view of a plurality of the FIG. 1 containers arranged in a stacked relationship.

As shown in FIGS. 1 and 3, each case 10 is equipped with an opposed pair of movable brackets 22 and 23, each bracket comprising a pair of spaced legs 24 and 26 connected at one end by an intermediate longitudinal member 28, the other end of said legs being pivotally mounted in the ends of the case near opposite side edges. The legs 24 and 26 are of an overall length equal approximately to one-half the height of the case, whereas the longitudinal member 28 is slightly longer than the length of the case. The brackets are preferably composed of heavy metal wire or rod which is bent to the desired shape, although other materials can be employed.

The brackets 22 and 23 are positioned and mounted so as to project from the sides of the case when in an open position (see bracket 23 in FIG. 1), and to cover or closely overlie a longitudinal portion of the open top of the case when in a closed position (see bracket 22 in FIG. 1). When in an open position, portions of the brackets abut lower edge portions of the case in such manner that the legs 24 and 26 and longitudinal member 28 are held in a substantially noncompressible, rigid spaced relationship laterally outward from the bottom edge portions of the side walls of the case. In such open position, the brackets are supported from the case in a rigid or substantially unyielding fashion and provide what is in effect an extension or skeletal adjunct to the sides of the case, particularly along the bottom edge.

In the particular embodiment shown, the bracket legs 24 and 26 are pivotally mounted in the sides of the case along a longitudinal axis and, when in an open position, are shaped to define a vertical portion, such as 25, spaced from the vertical corner of the case. The vertical portion 25 terminates in a vertical loop or projection 27, which extends inwardly and fits within a recess 29 at the bottom corner of the end of the case and abuts the end of the recess. The loop 27 merges into the longitudinal portion 28 of the bracket, which portion has one or more intermediate undulations or indentations 30. When in an open position, the indentation 30 engages or abuts against the lower longitudinal edge of the case and may engage over a downwardly facing lug 32 in the case in order to hold the bracket firmly in an open position.

As mentioned previously, the brackets in an open position provide a solid adjunct to the width of the case, particularly at or near the bottom. The conventional dairy conveyor has fixed sidewalls about 4 inches high. The brackets 22 and 23 in an open position are near enough to the bottom of the case so as to be lower than the top edge of the side walls when riding on the conveyor belt. The lateral dimension of projection of each bracket from the side of the case is preferably in the order of 1¼ inches, such that the total width increase with both brackets open will be approximately 2½ inches. The overall effective width of the box with brackets in an open position is designed to correspond to a standard width dimension of a conventional dairy case. This enables the open case to be processed by conventional dairy equipment, such as floor chain conveyors, automatic stackers and unstackers, and washers, since much of this equipment either grips a case having a standard width by its sides or otherwise is operable solely on a case having a standard transverse dimension.

It is important that the adjunctive width increase provided by the brackets be firm and substantially unyielding and noncompressible, and hence the projecting portions of the brackets when in open position are supported by other portions which abut the case in the area of extension. If the brackets were easily compressible toward the body of the case or otherwise easily movable, they would not provide proper handling qualities in the environment of conventional dairy equipment.

When the brackets 22–23 are in a closed position, as shown in FIGS. 1, 3 and 4, the longitudinal portions 28 overlie the open top of the case 10 and serve to retain the filled bag 16 therein. In such position, the bracket legs 24 and 26 overlie the ends of the case, and no portion of the brackets extend from the sides. A pair of lugs 34 may be provided in the external end surfaces of the case to engage the legs 24 and 26 and retain or lock them in a closed position. When the brackets are in a closed position, the width of the case is defined by its normal width dimension, which corresponds to the previously described standard size cardboard carton and fits into a standard refrigerated cabinet, shown generally at 36 in FIG. 4. Also, the loops 27 are located at the upper end corners of the case and provide protection for the case during shipping and handling.

Figure 2:
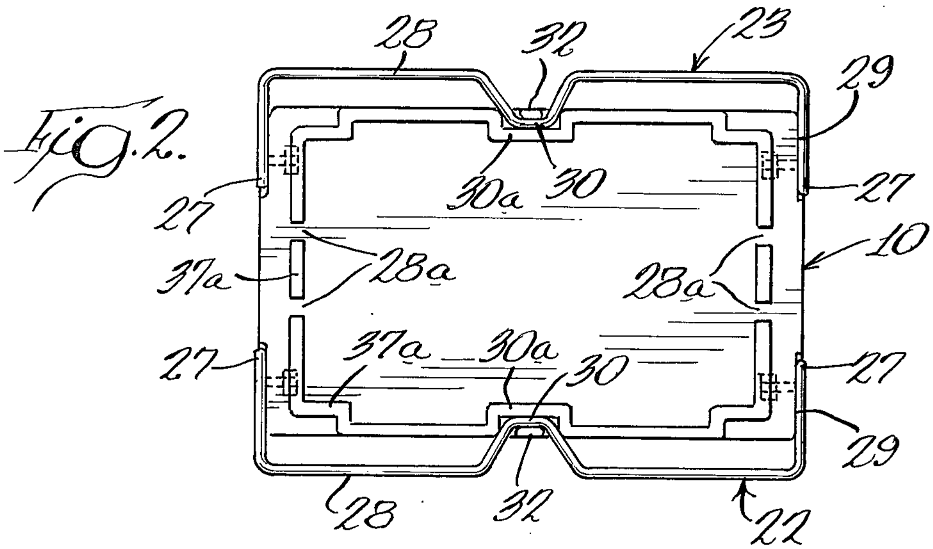
FIG. 2 is a bottom view of the container shown in FIG. 1 except that both brackets are shown in open position.

Whether the brackets are in open or closed position, the cases may be stacked vertically as shown in FIG. 3, and are provided with interlocking projections to facilitate retention and stability of a stack of cases. In particular, as shown in FIG. 1, each case is provided at the top edge thereof with raised corner portions 37 and recessed end and side wall portions 38. In complementary fashion, as shown in FIG. 2, each case is provided on the bottom thereof with a generally peripheral rib 37*a* which is spaced inwardly from the end walls and corners of the case so as to fit within the raised corner portions 37 at the top edge of the case below it in the stack. At the sides of the case, the rib 37 is substantially flush with the side walls so as to fit within and rest upon the recessed portions 38 in the side walls of the underlying case. Thus, an upper case in the stack rests on and is supported by the raised corners 37 and the top edges 38 of the side walls of the case below it, and the rib 37*a* of the upper case interfits with the four corners 37 of the lower case to maintain the cases in vertical alignment in the stacked relationship.

The end walls of the cases are recessed at their top edges for reception of the longitudinal portions 28 of the brackets 22 and 23 in their closed positions, whereby the brackets are spaced below or are substantially flush with the top edges of the corners 37 so as to accommodate the above-described internesting of two cases. To avoid interference, the rib 37*a* is cut away or interrupted at 28*a* for reception or passage of the bracket parts 28 in the closed positions of the brackets. Also, the rib is indented at 30*a* for reception of and to provide abutment surfaces for the indentations 30 on the two brackets in the open positions of the brackets, whereby the brackets again do not interfere with nesting of cases in the vertical stack.

Thus, the cases may be stacked and interlocked in stable relationship with the brackets in their open or their closed positions.

In use in a dairy, the brackets 22 and 23 of empty cases are opened, which increases the effective width of the case to enable processing through standard washing and handling equipment. For example, as shown in FIG. 3, the cases may be stacked vertically by conventional stacking equipment and conveyed on a standard floor chain conveyor, whereas narrower cases would tend to jam in such equipment and cause toppling of the stack.

A plastic bag 16 is inserted either before or after filling and with or without a separate paper liner, into each case. The drain tube 20 from the bag 16 is positioned adjacent one end of the top of the case near one of the hand holes 12 to allow later access to the tube. Throughout processing in the dairy and in some cases, during shipment, the brackets 22–23 are retained in their open position so that the cases will conform to and be handled by the conventional processing equipment in the same manner as an ordinary dairy shipping case. Upon delivery to a consumer, the brackets are swung up or pivoted to their closed position to serve as retainers for the bag and to permit the case to be stood on end as shown in FIG. 4.

After the filled case has reached the consumer, it is installed in a standard refrigerated enclosure 36 (FIG. 4) by resting the end at which the tube is located at the bottom of the refrigerator with the open top facing outwardly. Either prior to or after installation in the refrigerator, the tube 20 is removed through the hand hole 12 and is led through the conventional valve mechanism 39 located externally of the refrigerator cabinet.

Although not shown in FIG. 4, the refrigerator 36 has one or two doors which are closed and an opening is provided in the bottom of the refrigerator to accommodate the tube 16 when the door is closed. The liquid in the container may then be dispensed by cutting off the sealed end of the tube. After the container has been depleted, the brackets may be opened and the interior contents may be discarded, thereby allowing the empty case to be returned to the supplier and reused.

I claim:

1. A container comprising an open top case composed of substantially rigid and reusable materials, and a pair of rigid brackets movably mounted on said case, said brackets being moveable between a closed position overlying the open top of the case and an open position wherein the brackets abut the sides of the case near the bottom thereof and project laterally outward therefrom, said brackets when in open position having a significant lateral dimension and increasing the effective rigid width dimension of the case at the bottom.

2. The container of claim 1 wherein means are provided for locking said brackets in said closed position.

3. The container of claim 1 wherein means are provided for locking said brackets in said open position.

4. The container of claim 1 wherein a liquid filled plastic bag is provided within said case, and a drain tube is provided on said bag.

5. The container of claim 4 wherein hand hold openings are provided at the ends of the case near the top edge thereof, and said drain tube is located adjacent one of said openings.

6. The container of claim 1 wherein said brackets are pivotally mounted between the ends of the case about a longitudinal axis and are swingable between said closed and open position.

7. The container of claim 1 wherein each of said brackets comprise a pair of spaced legs connected by a longitudinal member, said longitudinal member being laterally spaced in an unyielding manner from the bottom edge of said case with said brackets in open position.

8. The container of claim 7 wherein said brackets have an extension therefrom which abuts against said case with said brackets in open position.

9. The container of claim 7 wherein said longitudinal member comprises an indentation which is abuttable against said case with said brackets in open position.

10. A method of packaging and dispensing milk in bulk form wherein the milk is to be dispensed from a bulk container adapted to fit into a standard dispensing cabinet having a maximum internal width, comprising the steps of providing a flexible bag filled with milk within an open top rigid case, said case having a width adapted to fit into said dispensing cabinet, dispensing said milk from said bag, removing and discarding said bag, augmenting the effective unyielding width of said case to a wider dimension, and processing said case with equipment responsive to cases having said wider dimension.

11. A method of packaging and dispensing milk in bulk form comprising the steps of placing a disposable milk dispensing bag in a rigid open top reusable case having a temporary rigid external width dimension corresponding to the width of a standard dairy case for handling by conventional dairy equipment, placing retainer means over the open top of said case for retaining the bag therein, decreasing the external width of the case to a dimension corresponding to the width of a standard bulk milk dispensing case and placing the case at its decreased width in an upright position in a milk dispensing cabinet for dispensing the milk from the case.

* * * * *